United States Patent [19]

Hubele

[11] 3,893,936
[45] *July 8, 1975

[54] CONTROL OF BACTERIA WITH DETERGENT OR CLEANING COMPOSITIONS CONTAINING PHENYLTHIOUREAS

[75] Inventor: Adolf Hubele, Riehen, Switzerland

[73] Assignee: Ciba-Geigy AG, Basel, Switzerland

[ * ] Notice: The portion of the term of this patent subsequent to May 21, 1991, has been disclaimed.

[22] Filed: May 8, 1972

[21] Appl. No.: 250,937

Related U.S. Application Data

[62] Division of Ser. No. 34,594, May 4, 1970, abandoned.

[30] Foreign Application Priority Data

May 7, 1969 Switzerland.......................... 7008/69
July 25, 1969 Switzerland....................... 11440/69

[52] U.S. Cl. .............. 252/106; 252/107; 117/138.5
[51] Int. Cl............................................. C11d 3/48
[58] Field of Search ............ 252/106, 107; 424/322; 117/138.5

[56] References Cited
UNITED STATES PATENTS

| | | | |
|---|---|---|---|
| 2,846,399 | 8/1958 | Beaver et al. | 252/107 |
| 2,894,986 | 7/1959 | Beaver et al. | 260/553 |
| 3,200,035 | 8/1965 | Martin et al. | 252/106 X |
| 3,395,233 | 7/1968 | Duerr et al. | 424/322 |
| 3,546,344 | 12/1917 | Martin et al. | 424/322 |
| 3,686,418 | 8/1972 | Taber et al. | 424/322 |
| 3,811,932 | 5/1974 | Hubele | 252/8.8 X |

Primary Examiner—P. E. Willis, Jr.
Attorney, Agent, or Firm—Frederick H. Rabin

[57] ABSTRACT

β-Chlorallylthioureas as well as their derivatives obtained by adding $Cl_2$ or $Br_2$ at the chlorallyl group are effective microbicides. They may be used as active agents in detergents or for the purpose of imparting to fibrous materials anti-microbial and anti-mycotic resistance as well as for controlling plant-pathogenic bacteria and fungi.

15 Claims, No Drawings

CONTROL OF BACTERIA WITH DETERGENT OR CLEANING COMPOSITIONS CONTAINING PHENYLTHIOUREAS

This is a division of application Ser. No. 34,594, filed on May 4, 1970, now abandoned.

This invention provides new biocidal thioureas of the formula

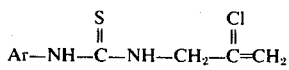

which also includes derivatives thereof obtained by the addition of $Cl_2$ or $Br_2$ at the chlorallyl group, and in which Ar represents a phenyl group which may be unsubstituted or substituted by one or more of the following residues; halogen, $NO_2$, —CN, —SCN, alkyl or haloalkyl with up to 4 carbon atoms the latter group preferably being —$CF_3$—$CF_2Cl$, —$CFCl_2$ or —$CCl_3$.

As halogens there are to be understood fluorine, chlorine, bromine or iodine, preferably chlorine and bromine.

Those compounds are preferred in which the phenyl group is substituted by not more than three of the said substituents. Especially active compounds of the formula I are those containing substituents in the 3,4- or 3,5-positions of the phenyl nucleus. The substituents are preferably electronegative (= electron drawing), but this does not exclude the similtaneous presence of electroneutral substituents such as methyl, ethyl, n-propyl, isopropyl, n-butyl or sec.-butyl groups.

The active substances of the formula I are active against human- and plant-pathogenic bacteria and fungi.

They have a very good activity against members of the class phycomycetes, for example, phytopathogenic fungi such as Botrytis and Piricularia, but also against various other pathogens on corn, soya beans, maize, rice, vegetables fruit and other cultivated plants.

They are particularly active against the following species of fungi: species of *Cochliobolus miyabeanus*, species *of Corticium, species of Cerospora, species of Alternaria,*

*Venturia inaequalis, Podosphaera leucotricha, Uromyces phaseoli, Cercospora apii, Cercospora beticola, Cercospora musae, Piricularia sp., Erysiphe cichoriacearum, Penicillium digitatum, Sphaerotheca humuli, Diplocarpon rosae, Uncinula necator, Coccomyces hiemalis, Cladosporium carpophilum, Erysiphe graminis hordei, Monolinia (Sc lerotinia) Laxa, Monolinia (Sclerotinia) fructicola, Piricularia oryzae, Puccinia recondita, Puccinia coronata, Puccinia glumarum, Puccinia graminis tritici, Aspergillus niger, Aspergillus terreus, Rhizoctonia, Fusarium, Verticillium.* This list is not intended to be complete.

The active substances of the invention and preparations containing them also exhibit a toxic action on fungi that attack plants in the earth and some of which cause tracheomycoses, such as Fusarium cubense, Fusarium dianthi, Verticillium alboatrum and Phialophora cinerescens.

The active substances of this formula I can also serve as bacteriostatics, for example, as additions to soap, that is to say, they can be used principally in detergent and cleaning preparations.

For this purpose there have been found especially suitable the compounds of the formula

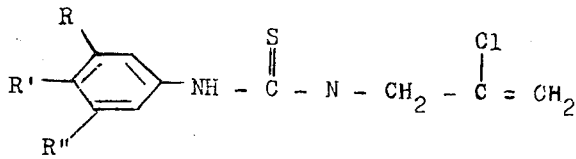

in which two of the substituents R, R' and R'' are identical or different from each other and represent Cl or $CF_3$, and the third represents a hydrogen atom.

The present invention also provides biocidal preparations, which contain as active components at least one thiourea of the formula I, or a derivative thereof produced by the addition of $Cl_2$ or $Br_2$ to the clorallyl group, together with one or more of the following additives: solvents, dispersing agents, wetting, agents, adhesives, binding or thickeners or diluents, stabilisers or further The active components can also be used in the textile field. When applied from aqueous dispersions or from solutions in organic solvents they possess an affinity for keratin fibres and can be used for protecting these fibres against attack by micro-organisms.

In the presence of protein materials, for example, blood or serum, and non-ionic, anionic or cationic organic surface-active compounds, such as are present in the form of soaps and synthetic wetting, emulsifying or washing agents, they do not lose their biocidal action. Moreover they have no objectionable odour, they are well tolerated by healthy skin and they cause no poisonous side effects towards warm blooded animals in the concentrations customarily used in disinfection.

All these properties render the detergent and cleaning preparations of this invention suitable for a very wide range of application. Thus, for example, there may be mentioned their use in the soap industry, in cosmetics, and generally in the care of the body and hygiene as disinfecting and preserving agents for a very wide variety of technical and natural products, and especially as detergent and cleaning preparations having a disinfecting and sanitizing action in houses and in industry. For these purposes they can be used in a very wide variety of forms. As examples there may be mentioned their use in the form of soap solutions, foam baths, sprays, especially foam sprays, solutions in organic solvents and the like. These applications are connected with biocidal finishing which is mainly anti-bacterial and anti-mycotic.

Of special interest, however, is the use of the detergents and cleaning agents of the invention for imparting an anti-microbial and anti-mycotic finish in or with the protection of textile and non-textile fibrous materials and laminar structures such as films, which may be in any stage of manufacture, against micro-organisms. The treatment of fibrous materials is especially important, because it has been found that the active substances of the formula (I) when applied from an aqueous bath exhibit a substantive affinity for a very wide variety of fibrous materials.

As fibrous materials there come into consideration natural and synthetic fibres. Among natural fibres there may be mentioned, in addition to mineral fibres, for example, asbestos, more especially cellulosic fibres, such as linen, sisal, cocus, bast, and especially cotton and nitrogenous fibres, such as leather and wool. As synthetic fibrous materials there come into consideration both polycondensates such as polyadducts and polymerisation products, that is to say, polymers in a wide sense, and also glass fibres. The polymer fibres may be derived from natural or synthetic polymers. Fibres of natural polymers are, for example, regenerated cellulose and cellulose di- to tri-acetate. Fibres derived from synthetic polymers are, for example, fibres of polyesters, polyamides, polyurethanes, polyacrylonitrile, polyvinyl chloride and polyethylene. In this manner it is possible to impart to these fibrous materials by simple washing with a detergent or cleaning preparation of the invention a finish that is lastingly biocidal, preferably anti-bacterial and anti-mycotic, and thus to protect these materials against attack by micro-organisms and other pests. Fibrous materials having a finish of this kind are not only themselves protected against attack by micro-organisms and moulds. They also protect their immediate surroundings and thus prevent, for example, the occurrence of unpleasant body and perspiration odours caused by microorganisms, which is especially advantageous with fully synthetic and cellulosic textile fibrous materials. The finish so produced has a good resistance to chlorine and perborate.

The detergent and cleaning preparations of the invention contain, in addition to the active substance of the formula (I), solid or liquid additions that are suitable for this purpose. Such additions are, for example, the usual washing assistants and washing-active substances. Washing-active substances are surface-active compounds. Such surface-active compounds are, for example, soaps, that is to say, salts, especially alkali metal salts, of fatty- acids of high molecular weight, or soap-free washing-active substances, for example, anion-active alkyl-aryl sulphonates, tetrapropyl-benzene sulphonates, fatty alcohol sulphonates, condensation products of fatty acids and methyl-taurine, condensation products of fatty acids with salts of oxyethane sulphonic acids, fatty acidprotein condensation products, primary alkyl sulphonates, non-ionic products, for example, condensation products of alkyl-phenols and ethylene oxides and also cation-active compounds. As washing assistants there are to be understood compounds which themselves possess no or only a small washing power, but influence the washing properties of a detergent. Thus, for example, they are able to impart an optimum pH-value to the washing liquor or to increase the dirt-tolerance capacity and the washing effect. Examples of such substances are electrolytes, for example, trisodium phosphate, sodium diphosphate, sodium carbonate, sodium bicarbonate, sodium sulphate, sodium metasilicate or water glass, cellulose glycolates, organic complex-formers (softeners), bleaching agents, optical brighteners, light protection agents, anti-oxidants, perfumes etc.

The new preparations of the invention may be in various forms depending on their mode of use, for example, in the form of solid, semi-solid or liquid soaps, in the form of pastes, powders, emulsions, suspensions, solutions in organic solvents, or sprays, powders, granulates, tablets, in capsules of gelatine or other material, or as salves.

The quantities in which the active substances of the formula (I) are used may vary within a wide range. Generally, however, 1 to 30 grammes per litre of liquor produce the desired effect. The detergent and cleaning preparations generally have a content of active substance of 0.3 to 10% by weight, and preferably 0.5 to 3% by weight.

As further ingredients the preparations of the invention may contain, depending on the purpose for which they are to be used, other biocidal substances, preferably fungicides or microbicides.

As components of the combination there may be mentioned, for example, the following active substances:

INORGANIC COMPOUNDS elementary sulphur
ammonium polysulphide
sodium polysulphide
barium polysulphide
calcium polysulphide and calcium thiosulphate (lime sulphur)
calcium hypochlorite
boric acid
sodium tetraborate decahydrate (borax)
zinc chloride
magnesium borate
nickel sulphate
potassium chromate
lead arsenate
cadmium chloride
cadmium carbonate

COPPER COMPOUNDS cuprous oxide
Bordeaux mixture
copper sulphate pentahydrate
copper oxychloride
cupric phosphate
tribasic cupric sulphate
basic cupric carbonate
cupric dihydrazine sulphate
copper ammine complexes
mixture of cupric sulphate and ammonium carbonate
mixture of cupric chloride and basic cupric sulphate
mixture of basic cupric carbonate and zinc salt
cupric zinc chromate complex (copper zinc chromate)
cupric zinc cadmium calcium chromate complex
cupric oleate
cupric salts of fatty acids
cupric naphthenate
cupric salt of 8-hydroxy-quinoline (oxine-copper)
cupric salt of 1,2-naphthoquinone-oxime-(2)
cupric salt of 3-phenyl salicylate

TIN AND MERCURY COMPOUNDS bis-(tri-n-butyl-tin) oxide
triphenyl-tin hydroxide (fentin hydroxide)
triphenyl-tin acetate (fentin acetate)
bis-(tributyl-tin) succinate
mercurous chloride (calomel)
mercuric chloride
mercuric oxide
mercury zinc chromate complex
mercuric lactate
ethyl-mercuri chloride
2-hydroxyethyl-mercuri acetate
ethyl-mercure isothiocyanate
3-ethoxypropyl-mercuri bromide
chloromethoxypropyl-mercuri acetate methoxyethyl-mercuri chloride
2-methoxyethyl-mercuri silicate
bis-(methyl-mercuri) sulphate
bis-(methyl-mercuri) ammonium acetate
ethyl-mercuri acetate
2-methoxyethyl-mercuri acetate
ethyl-mercuri phosphate
isopropylmethyl-mercuri acetate
methyl-mercuri cyanide
methyl-mercuri benzoate
N-cyano-N'-(methyl-mercuri)-guanidine
methyl-mercuri pentachlorophenolate
ethyl-mercuri 2,3-dihydroxypropyl mercaptide
methyl-mercuri 8-hydroxyquinolate (Ortho LM)
N-(methyl-mercuri)-1,4,5,6,7,7-hexachloro-bicyclo-[2.2.1] hept-5-en-2,3-dicarboximide
N-(ethyl-mercuri)-1,4,5,6,7,7-hexachloro-bicyclo-[2.2.1] hept-5-en-2,3-dicarboximide
sodium salt of ethyl-mercuri thiosalicylate
N-(ethyl-mercuri)-p-toluene sulphonic acid anilide
phenyl-mercuri acetate (PAM)
phenyl-mercuri propionate
phenyl-mercuri triethanolammonium lactate (PAS)
phenyl-mercuri urea
N-(phenyl-mercuri)-1,4,5,6,7,7-hexachloro-bicyclo-[2.2.1] hept-5-en-2,3-dicarboximide
phenyl-mercuri dimethyl dithiocarbamate
phenyl-mercuri formamide
phenyl-mercuri chloride
phenyl-mercuri acetate
phenyl-mercuri benzoate
phenyl-mercuri borate
phenyl-mercuri hydroxide
phenyl-mercuri iodide
basic phenyl-mercuri nitrate
phenyl-mercuri monoethanolamine lactate
phenyl-mercuri salicylate
hydroxy-mercuri chlorophenol
hydroxy-mercuri trichlorophenol
hydroxy-mercuri nitrophenol
N-phenyl-mercuri ethylene diamine
phenyl-mercuri monoethanolammonium acetate
pyridyl-mercuri acetate
diphenyl-mercuri 8-hydroxyquinolate
mercuric complex with organic phosphates
mixture of methyl-mercuri 2,3-dihydroxypropyl mercaptide and methyl-mercuri acetate
mixture of ethyl-mercuri 2,3-dihydroxypropyl mercaptide and ethyl-mercuri acetate
mixture of hydroxy-mercuri chlorophenol and hydroxy-mercuri nitrophenol
mercury cadmium organic complex

FURTHER ORGANIC METAL COMPOUNDS.

cadmium succinate
cadmium di-n-propyl-xanthate
cadmium 8-hydroxyquinolate
phenylamino-cadmium acetate
phenylamino-cadmium dilactate
methyl-arsine sulphide
zinc octoate
zinc oleate

SIMPLE ORGANIC COMPOUNDS (ALIPHATICS).

formalin
paraformaldehyde
acrolein
methyl bromide
methyl isothiocyanate
tetraiodo-ethylene
1,3-dichloropropylene and related chlorinated $C_3$-hydrocarbons
1-chloro-3-bromopropylene-(1)
trans-1,4-dibromobutylene-(2)
1,3-dichloropropylene-(1)
1-chloro-2-nitropropane
2-chloro-1-nitropropane
trichloro-nitromethane
dichloro-tetrafluoro-acetone
sodium salt of propionic acid
calcium salt of propionic acid
chlorofumaric acid bis-β-chlorethyl ester
sorbic acid and its potassium salt
2-propylene-1,1-diol acetate
2-aminobutane
dodecyl-guanidine acetate (dodine)
dodecyl-guanidine phthalate
α-chloracetyl-1,3-aminopropionitrile
α-bromacetyl-valine amide
1,2-dichloro-1-(methylsulphonyl)-ethylene
1,2-dichloro-1-(butylsulphonyl)-ethylene
trans-1,2-bis-(n-propylsulphonyl)-ethylene

BENZENE DERIVATIVES.

p-dichlorobenzene
hexachlorobenzene (HCB)
1,2,4,5-tetrachloro-4-nitrobenzene (tecnazene)
pentachloro-nitrobenzene (quintozene)
1,3,5-trichloro-2,4,6-trinitrobenzene
isomeric mixture of 1,3,4-trichloro-2,6-dinitrobenzene and 1,2,3-trichloro-4,6-dinitrobenzene
2,4,5,6-tetrachloro-isophthalic acid nitrile
2,4-dinitrophenyl thiocyanate
diphenyl (biphenyl)
o-nitro-diphenyl
1-chloro-2,4-dinitronaphthalene
acenaphthene

PHENOLS.

2,4,6-trichlorophenol
2,4,5-trichlorophenol
2,4,5-trichlorophenyl acetate
2,4,5-trichlorophenyl chloracetate
zinc salt of trichlorophenol
m-cresyl acetate
2,3,4,6-tetrachlorophenol
pentachlorophenol (PCP)
o-dihydroxybenzene
2,4-dioxy-n-hexyl-benzene
2-phenyl-phenol
3,5-dibromo-salicylaldehyde
2-benzyl-4-chlorophenol
2,2'-dihydroxy-5,5'-dichloro-diphenylmethane (dichlorophene)
2,2'-dihydroxy-3,3',5,5',6,6'-hexachloro-diphenylmethane
2,2'-dihydroxy-5,5'-dichloro-diphenyl sulphide
2,2'-dihydroxy-3,3',5,5', tetrachloro-diphenyl sulphide
2,2'-dihydroxy-3,3',5,5'-tetrachloro-diphenyl sulphide disodium salt
4-chloro-o-phenyl-phenol
1,4-dichloro-2,5-dimethoxybenzene (chloroneb)

salicyl-anilide
bismuth salicylate
trifluoromethyl-salicyl-anilide halogenated with chlorine or bromine
brominated salicyl-anilide
(3,5-dimethyl-4-chlorophenoxy)-3thanol

DINITROPHENOL DERIVATIVES.

2-(1-methyl-n-propyl)-4,6-dinitrophenyl-2-methyl crotonate (binapacryl)
2-(1-methyl-n-propyl)-4,6-dinitrophenyl-isopropyl carbonate (dinobuton)
2-(1-methyl-n-heptyl)-4,6-dinitrophenyl crotonate (dinocap)
methyl-2,6-dinitro-4-(1-ethyl-hexyl)-phenyl carbonate + methyl-2,6-dinitro-4-(1-propyl-pentyl)-phenyl carbonate (dinocton p)
4-nonyl-2,6-dinitro-phenyl butyrate
S-methyl-2-(1-methyl-n-heptyl)-4,6-dinitrophenyl thiocarbonate

ANILINE DERIVATIVES.

2,6-dichloro-4-nitraniline (dichloran)
2-cyanethyl-N-phenyl carbamate
propynyl-N-phenyl carbamate
α-(2-bromacetoxy)-acetanilide

QUINONE DERIVATIVES.

2,3,5,6-tetrachloro-benzoquinone-(1,4) (chloranil)
2,3-dichloro-naphthoquinone-(1,4) (dichlone)
2-amino-3-chloro-naphthoquinone-(1,4)
2-chloro-3-acetylamino-napthoquinone-(1,4)
4-methyl-2,3,5,10-tetrahydro-3,5,10-trioxo-4H4-H-naphtho-(2,3,-b)-1,4-thiazine
2,3,6,7-tetrachloro-4a,8a-epoxy-1,2,3,4,4a,8a-hexahydro-1,4-methanonaphthalene-5,8-dione
quinone-oxime-benzoyl-hydrazone (benquinox)

TRICHLOROMETHYLTHIO-DERIVATIVES.

N-(trichloromethylthio)-phthalimide (folpet)
N-(trichloromethylthio)-cyclohex-4-en-1,2-dicarboximide (captan)
N-(1,1,2,2-tetrachlorethylthio)-cyclohex-4-en-1,2-dicarboximide (captafol)
N-methane-sulphonyl-N-trichloromethylthio-p-chloraniline
N'-dichlorofluoromethylthio-NN-dimethyl-N'-phenyl sulphonamide (dichlofluanide)
S-(2-pyridyl-1-oxide)-S'-trichloromethyl disulphide hydrochloride

ORGANIC PHOSPHATES.

0,0,0-trimethyl thiophosphate
0,0-diethyl-phthalimido-phosphonothioate
5-amino-bis-(dimethylamido)-phosphinyl-3-phenyl-1,2,4-triazole (triamiphos)
5-methylamino-bis-(dimethylamido)-phosphinyl-3-phenyl-1,2,4-triazole
0,0-diethyl-0-2-pyrazinyl-phosphorthioate
0-ethyl-S,S-diphenyl-dithiolphosphate
0-ethyl-S-benzyl-phenyldithiophosphate
0,0-diethyl-S-benzyl-thiolphosphate

DITHIOCARBAMATES.

zinc salt of dithiocarbazinic acid
sodium N-methyl-dithiocarbamate (metham)
sodium N-methoxyethyl-dithiocarbamate
sodium N,N-dimethyl-dithiocarbamate (DDC)
ammonium N,N-dimethyl-dithiocarbamate
zinc N,N-dimethyl-dithiocarbamate (ziram)
iron N,N-dimethyl-dithiocarbamate (ferbam)
copper N,N-dimethyl-dithiocarbamate
disodium ethylene-1,2-bis-dithiocarbamate (nabam)
zinc ethylene-1,2-bis-dithiocarbamate (zineb)
iron ethylene-1,2-bis-dithiocarbamate
manganous ethylene-1,2-bis-dithiocarbamate (maneb)
calcium ethylene-1,2-bis-dithiocarbamate
ammonium ethylene-1,2-bis-dithiocarbamate
zinc propylene-1,2-bis-dithiocarbamate (mezineb) (propineb)
bis-(dimethylthiocarbamyl)-ethylene-1,2-bis-dithiocarbamate
complex consisting of "maneb" and zinc salt (mancozeb)
tetraethyl-thiuram monosulphide
bis-(N,N-dimethyl-dithiocarbamylmercapto)-methylarsine
tetramethyl-thiuram disulphide (thiram)
dipyrrolidyl-thiuram disulphide
N,N-bis-(dimethylamino)-thiuram disulphide
polyethylene-thiuram sulphide
complex consisting of "zineb" and polyethylene-thiuram disulphide (metiram)

O-HETEROCYCLES bis-(3,4-dichloro-2(5)-furanoyl)-ether (mucochloric anhydride)
2-methoxymethyl-5-nitrofurane
5-nitro-furfuraldoxime-(2)
5-nitro-furfuryl-amidoxime-(2)
1-oxy-3-acetyl-6-methyl-cyclohexene-(5)-dione-(2,4) (dehydroacetic acid)

1-N-HETEROCYCLES

3-[2-(3,5-dimethyl-2-oxycyclohexyl)-2-hydroxyethyl]-glutarimide (cycloheximide)
phthalimide
pyridine-2-thiol-1-oxide or 1-hydroxypyridine-2-thione
zinc salt of pyridine-2-thiol-1-oxide
manganous salt of pyridine-2-thiol-1-oxide
S-1-(1-oxido-2-pyridyl)-isothiuronium chloride
α,α-bis-(4-chlorophenyl)-3-pyridine-methanol (parinol)
8-hydroxyquinoline (8-quinolinol)
8-hydroxyquinoline sulphate (chinosol)
benzoyl-8-hydroxyquinoline salicylate
3-(2-methyl-piperidino)-propyl-3,4-dichlorobenzoate
6-ethoxy-1,2-dihydro-2,2,4-trimethyl-quinoline (ethoxyquin)
N-lauryl-isoquinoline bromide
9-(p-n-hexyloxyphenyl)-10-methyl-acridinium chloride
9-(p-n-hexyloxyphenyl)-10-methyl-acridinium p-toluene sulphonate

2- AND 3-N-HETEROCYCLES 2-n-heptadecylimidazolidine acetate (glyodine)
1-hydroxyethyl-2-heptadecyl-imidazolidine
1-phenyl-3,5-dimethyl-4-nitrosopyrazole
1-p-chlorphenyl-3,5-dimethyl-4- nitrosopyrazole
1-p-sulphamylphenyl-3,5-dimethyl-4-nitrosopyrazole N-(1-phenyl-2-nitropropyl)-piperazine
2-dimethylamino-6-methyl-5-n-butyl-4-hydroxy-pyrimidine
N-dodeyl-1,4,5,6-tetrahydropyrimidine
N-dodecyl-2-methyl-1,4,5,6-tetrahydropyrimidine
2-n-heptadecyl-tetrahydropyrimidine
1-(4-amino-4-propyl-5-pyrimidyl-methyl)-2-methyl-pyridinium chloride hydrochloride
2-(2'-furyl)-benzimidazole (furidazole)
3-dodecyl-1-methyl-2-phenyl-benzimidazolium ferricyanide
methyl-N-benzimidazol-2-yl N-(butylcarbamoyl)-carbamate (benomyl)
2-(o-chloranilino)-4,6-dichloro-sym.-triazine
2-ethylamino-6-methyl-5-n-butyl-4-hydroxypyrimidine

S-HETEROCYCLES 5-chloro-4-phenyl-1,2-dithiol-3-one
2,3-dicyano-1,4-dithia-anthraquinone (dithianone)
2-(4-thiazolyl)-benzimidazole

NO-, NS- AND OS-HETEROCYCLES

4(2-chlorophenyl-hydrazono)-3-methyl-5-isoxazolone (drazoxolone)
thiazolidinone-4-thione-(2) (Rhodanine)
3-(p-chlorophenyl)-5-methyl-rhodanin
3,5-dimethyltetrahydro-1,3,5-thiadiazine-2-thione (dazomet)
3,3'-ethylene-bis-(tetrahydro-4,6-dimethyl)-2H-1,3,5-thiadiazine-2-thione (milneb)
3-benzylidene-amino-4-phenyl-thiazoline-2-thione
zinc salt of 6-chlorobenzthiazole-2-thiol
6-$\beta$-diethylamino-ethoxy-2-dimethylamino-benzthiazole dihydrochloride
monoethanolammonium-benzthiazole-2-thiol
lauryl-pyridinium-5-chloro-2-mercaptobenzthiazole
zinc and sodium salts of 2-mercaptobenzthiazole and dimethyldithiocarbamate
6-($\beta$-diethylaminoethoxy)-2-dimethylaminobenzthiazole dihydrochloride
3-trichloromethylthio-benzothiazolone
3-trichloromethylthio-benzoxazolone
3-(trichloromethyl)-5-ethoxy-1,2,4-thiadiazole
6-methyl-2-oxo-1,3-dithiolo [4,5-b]-quinoxaline (quinomethionate)
2-thio-1,3-dithiolo [4,5-b]-quinoxaline (thioquinox)
2,3-dihydro-5-carboxanilido-6-methyl-1,4-oxathine
3,3,4,4-tetrachlorotetrahydrothiophene-1,1-dioxide
2,3-dihydro-5-carboxanilido-6-methyl-1,4-oxathine-4,4-dioxide

QUATERNARY AMMONIUM COMPOUNDS cetyl-trimethylammonium bromide
n-alkyl($C_{12}$,$C_{14}$,$C_{16}$)-dimethylbenzyl-ammonium chloride
alkenyl-dimethylethylammonium bromide
dialkyldimethylammonium bromide
alkyldimethylbenzylammonium chloride
alkyl $C_9$–$C_{15}$tolylmethyltrimethylammonium chloride
di-isobutylcresoxyethoxyethyldimethylbenzylammonium chloride
p-di-isobutylphenoxyethoxyethyldimethylbenzylammonium chloride benzoyltrimethylammonium bromide

FUNGICIDAL ANTIBIOTICS gliotoxin
2,4-diguanidino-3,5,6-trihydroxycyclohexyl-5-deoxy-2-O-(2-deoxy-2-methylamino-$\alpha$-L-glucopyranosyl)3-C-formyl-$\beta$-L-lyxopentanofuranoside (streptomycin)
7-chloro-4,6-dimethoxycumaran-3-one-2-spiro-1'-(2'-methoxy-6'-methylcyclohex-2'-en-4' one) (griseofulvin)
4-dimethylamino-1,4,4$\alpha$,5,5$\alpha$,6,11,12$\alpha$-octahydro-3,5,6,10,12,12$\alpha$-hexahydroxy-6-methyl-1,11-dioxo-2-naphthacencarboximide (Oxytetracyclin)
7-chlor-4-dimethylamino-1,4,4$\alpha$,5,5$\alpha$, 6,11,12$\alpha$-octahydro-3,6,10,12,12$\alpha$-pentahydroxy-6-methyl-1,11-dioxo-2-naphthacencarboximide (chlortetracyclin)
(pimaricin)
(lancomycin)
(phleomycin)
(kasugamycin)
(phytoactin)
D(-)-thred-2,2-dichloro-N-[$\beta$-hydroxy-$\alpha$-(hydroxymethyl)-p-nitrophene-ethyl]acetamide (Chloramphenicol)
Blasticidin-S-benzylamino-benzene sulphonate

VARIOUS

N-(3-nitrophenyl)-itaconimide
phenoxy-acetic acid
sodium p-dimethylamino-benzene diazosulphonate
acrolein-phenylhydrazone
2-chloracetaldehyde-(2,4-dinitrophenyl)-hydrazone
2-chlor-3-(tolylsulphonyl)-propionitrile
1-chlor-2-phenyl-pentan-diol-(4,5)-thione-(3)
p-nonylphenoxypolyethylene-oxyethanol-iodine complex
($\alpha$-nitromethyl)-o-chlorobenzylthioethylamine hydrochloride
3-(p.-t.-butyl-phenylsulphonyl)-acrylonitrile
octachlorocyclohexenone
pentachlorobenzyl alcohol
pentachlorobenzyl acetate
pentachlorobenzaldehyde cyanhydrin
2-norcamphane-methanol
2,6-bis-(dimethylaminomethyl)-cyclohexanone
decachloroctahydro-1,3,4-metheno-2H-cyclobuta[cd]-pentalen-2-one
1-(3-chlorallyl)-3,5,7-triaza-1-azonia-adamantan chloride
coal tar and blast furnace tar

MIXTURES mixture nickelsulphate-maneb
mixture maneb-mercaptobenzthiazole
mixture zineb-mercaptobenzthiazole
mixture zineb-nickelous chloride
mixture zineb nickelous sulphate
mixture ziram-basic copper sulphate
mixture ziram-zinc-mercaptobenzthiazole
mixture thiram-cadmium chloride hydrate
mixture thiram-hydroxy-mercury chlorophenol
mixture thiram-phenyl-mercuri acetate
mixture polyethylene-bis-thiuramsulphide-copper oxychloride
mixture methylarsine-bis-(dimethyldithiocarbamate)-ziram-thiram mixture folpet-phenyl-mercuri acetate
mixture dodine-ferbam-sulphur
mixture dithianone-copper oxychloride
mixture dichlone-ferbam-sulphur
mixture dinocap-dinitrooctylphenol
mixture captan-quintozene-tribasic copper sulphate
mixture cadmium propionate-phenyl-mercuri propionate
formaldehyde-urea mixture
mixture phenylammonium cadmium dilactate-phenyl-mercuri formamide
mixture basic copper sulphate-zinc salts.

The new thioureas of the formula (I) can be made in a simple manner by reacting a reactive derivative of a thiocarbonic acid, for example thiophosgene, with an aniline of the formula AR—NH$_2$, which is substituted as indicated in connection with formula I, and with the amine of the formula

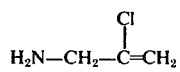

$$H_2N-CH_2-\underset{\underset{Cl}{|}}{C}=CH_2 \qquad III$$

the reactions being carried out in either order of succession.

For example, thiophosgene may be reacted with the aniline and the resulting isothiocyanate, AR—N=C=S, reacted with the amine of the formula III.

In the reverse order of succession a reactive derivative of the thiocarbonic acid may be reacted with an amine of the formula III, and the resulting isothiocyanate of the formula

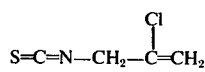

$$S=C=N-CH_2-\underset{\underset{Cl}{|}}{C}=CH_2 \qquad IV$$

reacted with the aforesaid aniline.

In a more simple and known manner the isothiocyanate of the formula IV may be prepared by reacting 2,3-dichloropropylene-(1) with an inorganic thiocyanate, preferably an alkaline metal or ammonium thiocyanate. If desired the chlorallyl group may be saturated with Cl$_2$ or Br$_2$ either before or after the formulation of the thiourea grouping.

The following examples illustrate the invention, the parts being by weight:

Example 1 Manufacture of:

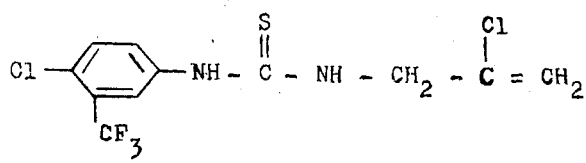

185 parts of 4-chloro-3-trifluoromethyl-aniline in 200 parts by volume of acetonitrile are added to 134 parts of [β-chlorallyl]-isothiocyanate in 200 parts by volume of toluene and 0.1 part of triethylene diamine. After heating the mixture for 20 hours at 80°C it is evaporated in vacuo to about 400 parts by volume, then diluted with petroleum ether (boiling at 50°–70°C), filtered and recrystallised from a mixture of toluene and petroleum ether (boiling at 50°–70°C). The product melts at 115°–116°C (compound No. 1).

In an analagous manner the following compounds of the formula V were obtained:

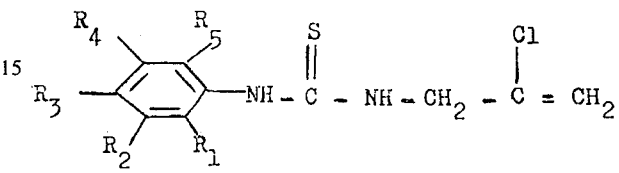

V

| Compound No. | R$_1$ | R$_2$ | R$_3$ | R$_4$ | R$_5$ | Melting at °C |
|---|---|---|---|---|---|---|
| 2 | H | Cl | Cl | H | H | 81 – 83° |
| 3 | H | H | H | H | H | 93 – 95° |
| 4 | H | C$_2$H$_5$ | H | H | H | 74 – 76° |
| 5 | H | CH$_3$ | H | H | H | 86 – 87° |
| 6 | H | CF$_3$ | H | H | H | 79 – 81° |
| 7 | H | CF$_3$ | H | CF$_3$ | H | 124 – 127° |
| 8 | CH$_3$ | Cl | H | H | H | 107 – 108° |
| 9 | Cl | H | NO$_2$ | H | H | 135 – 137° |
| 10 | Br | H | CH$_3$ | H | Br | 140 – 141° |
| 11 | H | H | Cl | H | H | 97 – 98° |
| 12 | H | Cl | H | H | H | 101 – 103° |
| 13 | H | Cl | CH$_3$ | H | H | 92 – 93° |
| 14 | H | NO$_2$ | Cl | H | H | 114 – 117° |
| 15 | Cl | H | Cl | Cl | H | 125 – 126° |
| 16 | Cl | H | H | Cl | H | 115 – 116° |
| 17 | H | H | C$_2$H$_5$ | H | H | 113 – 114° |
| 18 | Cl | Cl | H | H | H | 121 – 122° |
| 19 | Cl | H | Cl | H | H | 131 – 132° |
| 20 | H | Cl | H | Cl | H | 124 – 125° | and also the two compounds

No. 21
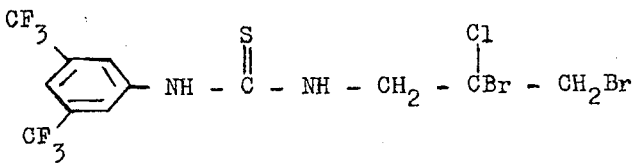

Melting at 125 – 126°C (with decomposition).

No. 22
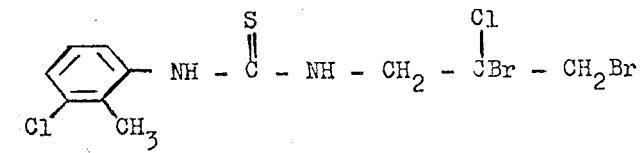

Melting at 160 – 161°C (with decomposition).

EXAMPLE 2 a. Dusting powder

Equal parts of an active substance of the invention and precipitated silica were finely ground. By admixture with kaolin or talc there can be produced a dusting powder containing preferably 1–6% of active substance.

b. A sprinkling powder

For preparing a sprinkling powder there are mixed together and finely ground, for example, the following components:

50 parts of the active substance of the invention
20 parts of highly adsorptive silica
25 parts of *Bolus alba* (kaolin)
3.5 parts of sodium 1-benzyl-2-stearyl-benzimidazole-6,3-disulphonate
3.5 parts of the reaction product of p.tert.-octylphenol and ethylene oxide.

c. An emulsion concentrate

Readily soluble active substances can also be formulated as emulsion concentrates in the following manner:

20 parts of active substance
70 parts of xylene
10 parts of a mixture obtained by mixing a reaction product of an alkyl-phenol with ethylene oxide and calcium dodecyl-benzene sulphonate. By diluting the concentrate with water to the desired concentration there is obtained an emulsion that can be sprayed.

EXAMPLE 3

In a greenhouse, Zucchetti plants were grown and sprayed once prophylactically with an aqueous liquor containing 0.1% of the active substance. Two days later the plants so treated were infected with spores of *Erysiphe cichoriacearum DC*. After 12 – 14 days the plants treated with the test compound No. 1 showed an attack of 5% and the plants treated with compound No. 8 showed no attack, whereas the untreated control plants suffered a 100% attack.

EXAMPLE 4

A mixture of equal parts of quartz sand and alumina was inoculated with an aqueous suspension of conidia of *Fusarium oxysporum*, the mixture was charged into pots, and the pots were placed in a cabinet in a greenhouse. Two days later the pots were sown with melon seeds, and then an aqueous liquor containing a quantity of active substance No. 2 equivalent to a rate of 30 kilogrammes per hectare was poured uniformly over the pots.

The pots were kept suitably moist. After 14 days 87% of the sown plants in the series of test treatments developed healthily, whereas 6% developed in the untreated control pots.

EXAMPLE 5

Bean plants were grown in a greenhouse and sprayed once prophylactically with an aqueous spray liquor containing 0.1% of an active substance of the formula I. Two days later the plants so treated were infected with uredo spores of *Uromyces phaseoli* (Pers.) wint., and placed for 2 days in a moist chamber. After subsequent incubation for 10 – 14 days in the greenhouse the follow active substances completely killed the mould:

| Compound No. | Action (%) |
| --- | --- |
| 9 | 100% |
| 14 | 100% |
| 15 | 100% |
| 16 | 100% |
| 17 | 100% |

In an analagous test with vine shoots as test plants and *Botrytis cinerea* as test mould, compounds Nos. 21 and 22 each gave a 95% kill. Their action was systemic.

In an analagous test with celery (*Apium graveolens*) as test plant and *Septoria apii* as test mould, compounds Nos. 3, 4 and 5 gave a kill of 80%, 80% and 95%, respectively.

EXAMPLE 6

The active substances of the formula (I) exhibit a remarkably strong action against gram-positive bacteria, especially against staphylococci and streptococci.

The antibacterial activity was determined in dilution tests as follows:

BACTERIOSTASIS AND BACTERICIDIC 20 mg of active substance were dissolved in 10 ml propylene glycol, of which 0.25 ml were added to 4.75 ml of sterile glucose broth, and then diluted 1 : 10 in small tubes. These solutions were then inoculated with a bacterium and incubated for 48 hours at 37° C (bacteriostatics). After a test period of 24 hours 1 oese (drop) of these cultures was stroked on glucose-agar plates and incubated for 24 hours at 37° C (bactericides). After the stated periods the following limiting concentrations were measured in parts per million of the bacteriostatics or bactericides:

| Bacterium | Compound | | | | | |
| --- | --- | --- | --- | --- | --- | --- |
| | No. 2 | No. 7 | No. 6 | No. 9 | No. 11 | No. 12 |
| Trich.mentagrophytes | 2.5 | 2.5 | 30 | 20 | 20 | 20 |
| E. coli | 20 | 20 | 30 | — | 60 | 40 |
| Asp.niger | 60 | — | — | — | — | — |
| Staph.aureus | 2.5 | 0.3 | 5.5 | 3 | 20 | 25 |
| | No.13 | No.15 | No.16 | No.19 | No.20 | |
| Trich.mentagrophytes | 10 | 20 | 30 | 30 | 5 | |
| E.coli | — | 30 | 30 | — | 20 | |
| Asp.niger | — | — | — | — | 60 | |
| Staph.aureus | 10 | 2 | 20 | 30 | 0.6 | |

— means not tested.

EXAMPLE 7.

Determination of the minimum inhibiting concentration (MIC) against bacteria and moulds in the gradient plate test.

The compounds of the formula 1. were mixed in the form of suitable formulations (for example, as solutions in dimethyl sulphoxide) of definite concentration with warm brain heart infusion - agar (bacteria) or mycophil - agar (moulds). The liquid mixtures were poured onto a solidified wedge-shaped base layer of agar, and allowed to solidify.

By means of a Pasteur pipette the test organisms were applied in the form of lines perpendicularly to the gradient. After an incubation period of 24 hours at 37°C. (bacteria), and 72 hours at 30°C. (moulds), the lengths of the germinations grown on the lines of inoculation were measured and expressed in parts per million of active substance.

| Compound No. | Minimum inhibiting concentration in ppm. | | | | | |
|---|---|---|---|---|---|---|
| | Bacteriostasis | Fungistasis | | | | |
| | Staphylococcus aureus | Aspergillus niger | Trichophyton mentagrophytes | Trichophyton rubrum | Epidermophyton floccosum | Microsporum gypseum |
| 1 | 0.4 | 60 | 0.8 | 5.5 | 20 | 20 |

I claim:

1. A method for controlling bacteria comprising applying to an area infested with said bacteria a detergent or cleaning composition comprising bacteriostatically effective amount of a compound of the formula

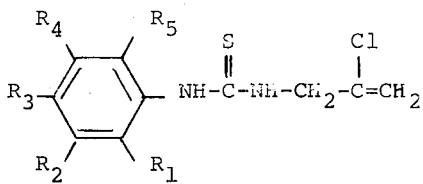

in which each of $R_1$, $R_2$, $R_3$, $R_4$ and $R_5$ is hydrogen, chlorine, bromine, nitro, alkyl of from 1 to 4 carbon atoms, or trifluoromethyl.

2. A method according to claim 1 in which the compound is

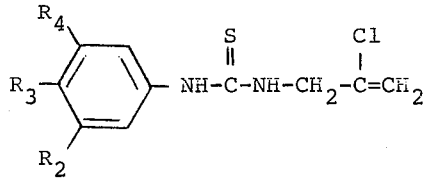

in which two of $R_2$, $R_3$ and $R_4$ are chlorine or trifluoromethyl, and the other of $R_2$, $R_3$ and $R_4$ is hydrogen.

3. The method according to claim 2 in which $R_2$ is trifluoromethyl, $R_3$ is chlorine, and $R_4$ is hydrogen.

4. The method according to claim 2 in which $R_2$ and $R_3$ are chlorine, and $R_4$ is hydrogen.

5. The method according to claim 1 in which, in the compound, $R_1$, $R_3$, $R_4$ and $R_5$ are hydrogen, and $R_2$ is trifluoromethyl.

6. The method according to claim 2 in which $R_2$ and $R_4$ are trifluoromethyl, and $R_3$ is hydrogen.

7. The method according to claim 1 in which, in the compound, $R_1$ is chlorine, $R_2$, $R_4$ and $R_5$ are hydrogen, and $R_3$ is nitro.

8. The method according to claim 1 in which, in the compound, $R_1$, $R_2$, $R_4$ and $R_5$ are hydrogen, and $R_3$ is chlorine.

9. The method according to claim 1 in which, in the compound, $R_1$, $R_3$, $R_4$ and $R_5$ are hydrogen, and $R_2$ is chlorine.

10. The method according to claim 1 in which, in the compound, $R_1$, $R_4$ and $R_5$ are hydrogen, $R_2$ is chlorine, and $R_3$ is methyl.

11. The method according to claim 1 in which, in the compound, $R_1$, $R_4$ and $R_5$ are hydrogen, $R_2$ is nitro, and $R_3$ is chlorine.

12. The method according to claim 1 in which, in the compound, $R_1$, $R_3$ and $R_4$ are chlorine, and $R_2$ and $R_5$ are hydrogen.

13. The method according to claim 1 in which, in the compound, $R_1$ and $R_4$ are chlorine, and $R_2$, $R_3$ and $R_5$ are hydrogen.

14. The method according to claim 1 in which, in the compound, $R_1$ and $R_3$ are chlorine, and $R_2$, $R_4$ and $R_5$ are hydrogen.

15. The method according to claim 2 in which $R_2$ and $R_4$ are chlorine, and $R_3$ is hydrogen.

* * * * *